United States Patent
Dai et al.

(10) Patent No.: US 10,901,119 B2
(45) Date of Patent: Jan. 26, 2021

(54) METHOD AND SYSTEM FOR EFFICIENT RENDERING OF ACCUMULATED PRECIPITATION FOR WEATHER EFFECTS

(71) Applicant: Robert Bosch GmbH, Stuttgart (DE)

(72) Inventors: Zeng Dai, Sunnyvale, CA (US); Liu Ren, Cupertino, CA (US); Lincan Zou, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 371 days.

(21) Appl. No.: 15/938,538

(22) Filed: Mar. 28, 2018

(65) Prior Publication Data

US 2019/0302311 A1    Oct. 3, 2019

(51) Int. Cl.
  *G01W 1/14*    (2006.01)
  *G06T 17/05*   (2011.01)
  *G01C 21/36*   (2006.01)

(52) U.S. Cl.
  CPC .......... *G01W 1/14* (2013.01); *G01C 21/3694* (2013.01); *G06T 17/05* (2013.01)

(58) Field of Classification Search
  None
  See application file for complete search history.

(56) References Cited

U.S. PATENT DOCUMENTS

| | | | |
|---|---|---|---|
| 5,469,535 A | 11/1995 | Jarvis et al. | |
| 6,268,861 B1 | 7/2001 | Sanz-Pastor et al. | |
| 6,384,830 B2 | 5/2002 | Baron et al. | |
| 6,788,304 B1 | 9/2004 | Hart et al. | |
| 6,885,939 B2 * | 4/2005 | Schmidt ............. | G01C 21/3638 701/428 |
| 6,961,061 B1 | 11/2005 | Johnson et al. | |

(Continued)

FOREIGN PATENT DOCUMENTS

| | | | | |
|---|---|---|---|---|
| CN | 103234958 | * | 8/2013 | ............. G01N 21/73 |
| EP | 1953701 A1 | | 8/2008 | |

(Continued)

OTHER PUBLICATIONS

Victoria Ortega Torres in Spatiotemporal Assessment and Visualization of Heavy-Precipitation Events Using Precipitation Radar and in situ Measurements, 52 pages, Oct. 2019 (Year: 2019).*

(Continued)

*Primary Examiner* — Tung S Lau
(74) *Attorney, Agent, or Firm* — Maginot, Moore & Beck LLP

(57) ABSTRACT

A method for generating graphics of a three-dimensional (3D) virtual environment includes: receiving, with a processor, weather data corresponding to a geographic region, the weather data including a sequence of precipitation intensity values, each precipitation intensity value being associated with a respective timestamp of a chronological sequence of timestamps; calculating, with the processor, a first precipitation accumulation value based on the sequence of precipitation intensity values, the first precipitation accumulation value corresponding to a first time; and rendering, with the processor, a depiction of accumulated precipitation in the 3D virtual environment, the depiction of accumulated precipitation depending on the first precipitation accumulation value.

14 Claims, 5 Drawing Sheets

(56) References Cited

U.S. PATENT DOCUMENTS

| | | | |
|---|---|---|---|
| 7,724,258 B2 | 5/2010 | Ebert et al. | |
| 9,752,889 B2 | 9/2017 | Ren et al. | |
| 10,173,646 B1 * | 1/2019 | Rice | B60S 1/56 |
| 2006/0253246 A1 | 11/2006 | Cera et al. | |
| 2017/0154460 A1 | 6/2017 | Hu | |
| 2019/0302311 A1 * | 10/2019 | Dai | G01C 21/3694 |
| 2019/0304158 A1 * | 10/2019 | Dai | G06T 15/20 |

FOREIGN PATENT DOCUMENTS

| | | | | |
|---|---|---|---|---|
| JP | 2014048273 | * | 3/2014 | G01S 13/95 |
| WO | 9963489 A1 | | 12/1999 | |

OTHER PUBLICATIONS

Sabino Metta in Precipitation Nowcasting by a Spectral-Based Nonlinear Stochastic Model, 13 pages, 2009 describes (Year: 2009).*
MichaelW. Halle in Multiple Viewpoint Rendering for Three-Dimensional Displays, 164 pages, 1997 (Year: 1997).*
"Mie Scattering", Wikipedia, Jan. 27, 2018, https://en.wikipedia.org/wiki/Mie_scattering, retrieved Mar. 28, 2018 (7 pages).

* cited by examiner

200

210

Receive, via a networking device, by executing program instructions with a processor, weather data corresponding to a geographic region, the weather data including a sequence of precipitation intensity values, each precipitation intensity value being associated with a respective timestamp of a chronological sequence of timestamps, the weather data to be used for generating graphics of a three-dimensional (3D) virtual environment for display on a display device, the program instructions being stored on a memory.

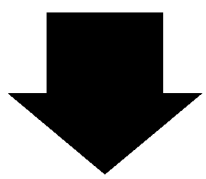

220

Calculate, by executing the program instructions with the processor, stored on a memory, a first precipitation accumulation value based on the sequence of precipitation intensity values, the first precipitation accumulation value corresponding to a first time.

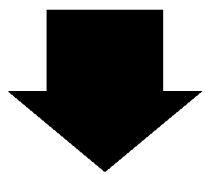

230

Render, by executing the program instructions with the processor, a depiction of accumulated precipitation in the 3D virtual environment, the depiction of accumulated precipitation depending on the first precipitation accumulation value.

222
Define an accumulation buffer length.

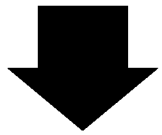

224
Identify a subset of precipitation intensity values from the sequence of precipitation intensity values, a number of precipitation intensity values in the subset of precipitation intensity values being equal to the accumulation buffer length, the precipitation intensity values in the subset of precipitation intensity values being those that are associated with the most recent respective timestamps as compared to the first time.

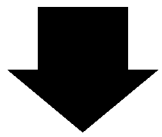

226
Calculate a respective buffer value for each precipitation intensity value in the subset of precipitation intensity values.

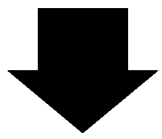

228
Calculate the first precipitation accumulation value as a sum of the respective buffer values for all of the precipitation intensity values in the subset of precipitation intensity values.

FIG. 4

(12) United States Patent

METHOD AND SYSTEM FOR EFFICIENT RENDERING OF ACCUMULATED PRECIPITATION FOR WEATHER EFFECTS

FIELD

This disclosure relates generally to the field of driver information and driver assistance systems (also known as in-vehicle information systems) and, more specifically, to systems and methods that provide graphical displays to a vehicle operator for mapping and navigation applications.

BACKGROUND

Unless otherwise indicated herein, the materials described in this section are not prior art to the claims in this application and are not admitted to the prior art by inclusion in this section.

Modern motor vehicles often include one or more driver information and driver assistance systems (hereinafter referred to as in-vehicle information systems) that provide a wide variety of information and entertainment options to occupants in the vehicle. Common services that are provided by the in-vehicle information systems include, but are not limited to, vehicle state and diagnostic information, mapping and navigation applications, hands-free telephony, radio and music playback, and traffic condition alerts. In-vehicle information systems often include multiple input and output devices. For example, traditional buttons and control knobs that are used to operate radios and audio systems are commonly used in vehicle information systems. More recent forms of vehicle input include touchscreen input devices that combine input and display into a single screen, as well as voice-activated functions where the in-vehicle information system responds to voice commands. Examples of output systems include mechanical instrument gauges, output display panels, such as liquid crystal display (LCD) panels, and audio output devices that produce synthesized speech.

Three-dimensional (3D) graphics methods have been widely used in different driver assistance and driver information applications. One typical example is navigation systems based on 3D maps. Compared with traditional two-dimensional (2D) maps, 3D maps are considered to be more helpful for easy driver orientation and fast location recognition. For example, photorealistic 3D mapping and navigation services are provided by multiple online and offline services including services offered by Apple, Google, and Nokia. Modern 3D graphics can produce a wide range of highly realistic graphical effects. In the context of 3D mapping and navigation applications, a graphics display system can generate landmarks such as geographic features, streets, buildings, and other landmarks in great detail. Furthermore, some 3D mapping systems can apply graphical effects that depict the weather and lighting conditions in the 3D virtual environment that correspond to the actual weather conditions in the real geographic region that is reproduced in the mapping application. For example, 3D graphics systems can produce graphical renderings of precipitation based on the current weather conditions in a geographic region.

While modern 3D graphics hardware and software is capable of reproducing a wide range of graphics, the generation of graphical effects such as precipitation typically requires substantial hardware execution resources to produce the graphical effects with a reasonable rendering speed for use a 3D mapping application. Modern processing devices including graphics processing units (GPUs) that can perform complex graphical rendering of realistic precipitation exist, but many hardware platforms including the graphics systems that are integrated into motor vehicles and those of inexpensive mobile electronic devices may lack the necessary hardware to produce realistic graphical depictions of precipitation. Furthermore, even some mobile electronic devices that now include increasingly powerful graphics hardware may consume an undesirably large amount of electrical power to produce the graphics, which often results in a drained battery that can be counterproductive to the use of a mapping and navigation application when traveling. Consequently, improvements to methods and systems for producing graphical renderings of precipitation in a 3D virtual environment in a computationally efficient manner would be beneficial.

SUMMARY

A method for generating graphics of a three-dimensional (3D) virtual environment is disclosed. The method comprises: receiving, with a processor, weather data corresponding to a geographic region, the weather data including a sequence of precipitation intensity values, each precipitation intensity value being associated with a respective timestamp of a chronological sequence of timestamps; calculating, with the processor, a first precipitation accumulation value based on the sequence of precipitation intensity values, the first precipitation accumulation value corresponding to a first time; and rendering, with the processor, a depiction of accumulated precipitation in the 3D virtual environment, the depiction of accumulated precipitation depending on the first precipitation accumulation value.

A system for generating graphics of a three-dimensional (3D) virtual environment is disclosed. The system comprises: a display device configured to display the graphics of the 3D virtual environment; a networking device; a memory configured to store programmed instructions; and a processor operatively connected to the display device, the wireless networking device, and the memory. The processor is configured to execute the programmed instructions to: receive, via the networking device, weather data corresponding to a geographic region, the weather data including a sequence of precipitation intensity values, each precipitation intensity value being associated with a respective timestamp of a chronological sequence of timestamps; calculate a first precipitation accumulation value based on the sequence of precipitation intensity values, the first precipitation accumulation value corresponding to a first time; and render a depiction of accumulated precipitation in the 3D virtual environment, the depiction of accumulated precipitation depending on the first precipitation accumulation value.

BRIEF DESCRIPTION OF THE DRAWINGS

The foregoing aspects and other features of the method and system are explained in the following description, taken in connection with the accompanying drawings.

FIG. 2 shows a method for rendering accumulated precipitation in a 3D virtual environment in a computationally efficient manner.

FIG. 4 shows one exemplary method of calculating the precipitation accumulation value based on the sequence of precipitation intensity values.

DETAILED DESCRIPTION

Figure 1:
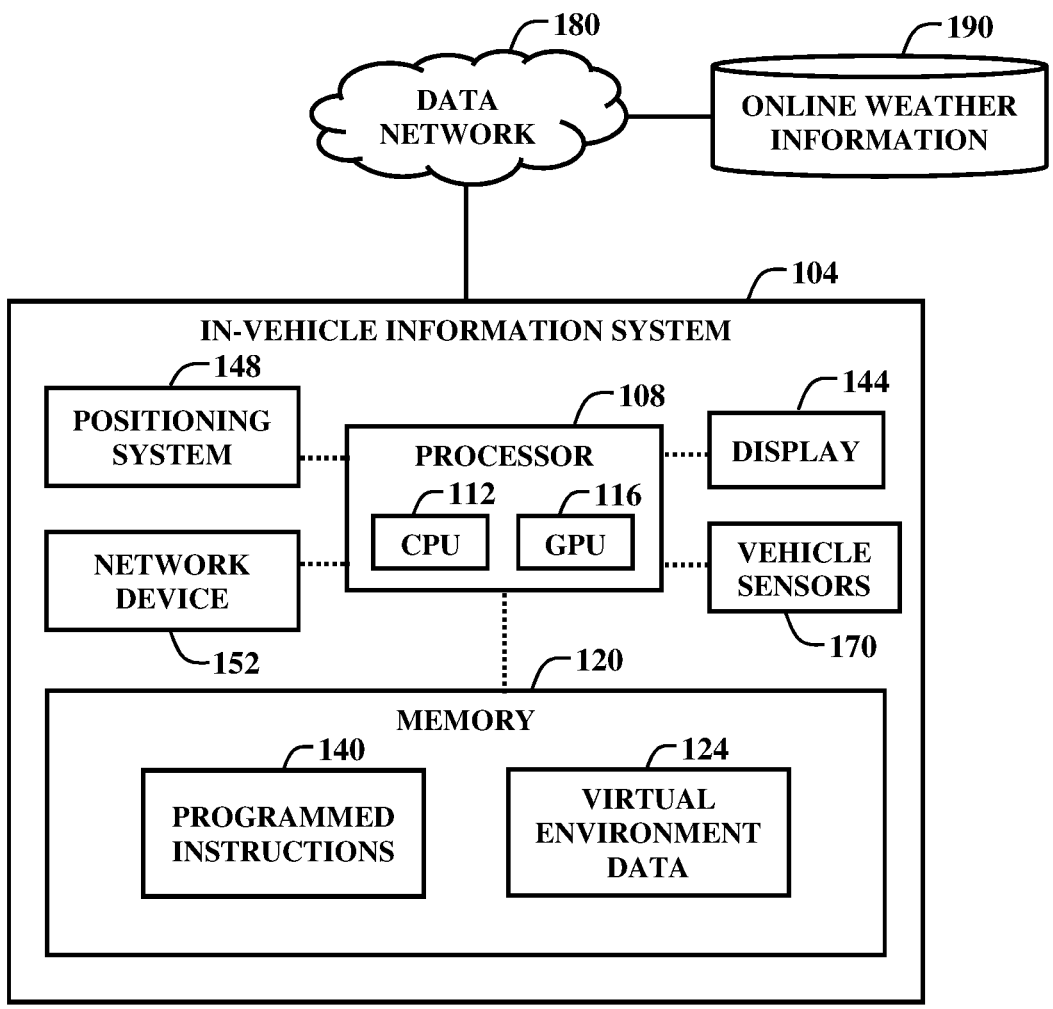
FIG. 1 is a schematic diagram of an in-vehicle information system that is configured to generate a graphical display of a 3D virtual environment including a representation of precipitation that reflects current weather conditions in a real-world geographic location.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

In-Vehicle Information System

FIG. 1 depicts a system 100 that includes an in-vehicle information system 104 (which may also be referred to herein as a "graphical display system") that generates a graphical display of a 3D virtual environment including a representation of precipitation that reflects current weather conditions in a real-world geographic location in a computationally efficient manner. The in-vehicle information system 104 includes a processor 108, memory 120, display 144, optional positioning system 148, and optional network device 152. Hardware embodiments of the in-vehicle information system 104 include, but are not limited to, personal computer (PC) hardware, embedded system hardware including embedded computing hardware for use in a motor vehicle, and mobile electronic devices including smartphone and tablet computing devices. In the system 100, a wireless data network 108 connects the in-vehicle information system 104 to one or more online weather information sources 190.

In the in-vehicle information system 104, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, network device 152, and positioning system 148, into a single integrated device, while in other embodiments the CPU 112 and GPU 116 are connected to each other via a peripheral connection device such as PCI express or another suitable peripheral data connection. In one embodiment, the CPU 112 is a commercially available central processing device that implements an instruction set such as one of the x86, ARM, Power, or MIPS instruction set families. The GPU includes hardware and software for display of both 2D and 3D graphics. In one embodiment, processor 108 executes software drivers and includes hardware functionality in the GPU 116 to generate 3D graphics using, for example, the OpenGL, OpenGL ES, Vulkan, or Direct3D graphics application programming interfaces (APIs). For example, the GPU 116 includes one or more hardware execution units that implement fragment shaders, vertex shaders, and optionally geometry shaders, tessellation shaders, and compute shaders for the processing and display of 2D and 3D graphics. During operation, the CPU 112 and GPU 116 execute stored programmed instructions 140 that are retrieved from the memory 120. In one embodiment, the stored programmed instructions 140 include operating system software and one or more software application programs that generate 3D graphics, including mapping and navigation applications. The stored program instructions 140 include software that control the operation of the CPU 112 and the GPU 116 to generate graphical depictions of precipitation based on the embodiments described herein.

The processor 108 executes the mapping and navigation program and generates 3D graphical output with graphical transformations that depict map features and weather conditions including precipitation in a geographic region that is external to the vehicle an intuitive manner. The processor 108 is configured with software and hardware functionality by storing programmed instructions in one or memories operatively connected to the processor 108 and by operatively connecting the hardware functionality to the processor and/or other electronic, electromechanical, or mechanical components to provide data from sensors or data sources to enable the processor to implement the processes and system embodiments discussed below.

The memory 120 includes both non-volatile memory and volatile memory. The non-volatile memory includes solid-state memories, such as NAND flash memory, magnetic and optical storage media, or any other suitable data storage device that retains data when the in-vehicle information system 104 is deactivated or loses electrical power. The volatile memory includes static and dynamic random access memory (RAM) that stores software and data, including graphics data and map feature data, during operation of the in-vehicle information system 104. In some embodiments the GPU 116 and the CPU 112 each have access to separate RAM devices (e.g. a variant of DDR SDRAM for the CPU 112 and a variant of GDDR, HBM, or other RAM for the GPU 116) while in other embodiments the CPU 112 and GPU 116 access a shared memory device. In addition to the programmed instructions 140, the memory 120 stores three dimensional virtual environment graphics data 124. The graphics data 124 include geometric models, textures, and other data that the processor 108 uses to generate three-dimensional graphics of a 3D virtual environment.

The in-vehicle information system 104 includes an optional network device 152 that is configured to send and receive weather data from external computing systems, such as the online weather information sources 190, through a data network 180. Examples of the network device 152 include wired network adapters such as Ethernet and universal serial bus (USB) adapters, and wireless network adapters such as wireless wide area network (WWAN), 802.11 or Bluetooth wireless local area network (WLAN) adapters.

As depicted in FIG. 1, the online weather information sources 190 include any online service that provides data in a manner that is accessible by the in-vehicle information system 104 through the data network 180. For example, online information sources 190 include live weather services that provide information related to the weather in a geographic region around the vehicle, including cloud cover, wind, temperature, precipitation, and road hazard conditions. Another online information source 190 is an online traffic service that produces reports regarding traffic volume, accidents, and other traffic information.

The in-vehicle information system 104 includes an optional positioning system device 148 that is operatively connected to the processor 108. Examples of positioning systems include global positioning system (GPS) receivers that use one or more satellite navigation systems, radio triangulation receivers that identify a location of the in-vehicle information system 104 with respect to fixed wireless transmitters, and inertial navigation systems. During operation, the processor 108 executes mapping and navigation software applications that retrieve location information from the positioning system 148 to identify a geographic location of the in-vehicle information system 104 and to adjust the display of the virtual environment to correspond to the location of the in-vehicle information system 104. In navigation applications, the processor 108 identifies the location and movement of the in-vehicle information system 104 for the generation of routes to selected destinations and display of the routes in the 3D virtual environment.

During operation, the processor 108 receives data corresponding to the environment around the vehicle from multiple sources. In the embodiment of FIG. 1, the sources include the vehicle sensors 170, online weather information sources 190, and the positioning system 148. The processor 108 uses some environment data indirectly. For example, the positioning system 148 provides data pertaining the location of the vehicle, and the processor 108 uses the position data as part of a query to an online information source 190 to, for example, identify weather conditions and traffic in the geographic region around the vehicle or in another geographic region along the route of the vehicle where the vehicle will be traveling in the future.

In the in-vehicle information system 104, the display 144 is either an integrated display device, such as an LCD or other visual display device, which is integrated with a housing of the in-vehicle information system 104, or the display 144 is an external display device that is operatively connected to the in-vehicle information system 104 through a wired or wireless interface to receive output signals from the processor 108 to generate a display of the 3D virtual environment. In an embodiment where the in-vehicle information system 104 is an in-vehicle embedded computing device, the display 144 is an LCD or other flat panel display that is located in the console of a vehicle, or the display 144 is a head-up display (HUD) or other projection display that displays the 3D virtual environment on a windshield or other display surface in the vehicle. Other display device embodiments include, for example, stereoscopic displays that form two different 2D images of a 3D virtual environment to simulate a true three-dimensional display of the virtual environment.

In the in-vehicle information system 104, the vehicle sensors 170 include any device in the vehicle that generates digital data corresponding to the condition of the vehicle or the environment around the vehicle that the processor 108 uses to adjust a visual depiction of the static map features. Examples of sensors that are used in different vehicle configurations include, but are not limited to, cameras, light sensors, thermometers, hygrometers, motion sensors, speedometers, range finding sensors, and the like. In some embodiments, an in-vehicle clock is another sensor that records the time of day around the vehicle. In some embodiments, the positioning system 148 or network device 152 receive time data to set the clock and identify the position of the sun or moon in the sky at different times when the vehicle is in different geographic locations. In the example of FIG. 1, the positioning system 148 also acts as a sensor to indicate the location and optionally direction of travel and speed of the vehicle. In some vehicles, additional sensor data may be provided indirectly from subsystems that perform other functions in the vehicle.

Methods for Efficient Rendering of Accumulated Precipitation

Various methods and processes for rendering accumulated precipitation or other similar weather effects are described below. In the description of the methods, statements that the method is performing some task or function refers to a controller or general purpose processor executing programmed instructions stored in non-transitory computer readable storage media operatively connected to the controller or processor to manipulate data or to operate one or more components in the in-vehicle information system 104 to perform the task or function. Particularly, the processor 108, CPU 112, and/or GPU 116 above may be such a controller or processor and the executed program instructions may be the programmed instructions 140 stored in the memory 120. Additionally, the steps of the methods may be performed in any feasible chronological order, regardless of the order shown in the figures or the order in which the steps are described.

FIG. 2 shows a method 200 for rendering accumulated precipitation or other similar weather effects in a 3D virtual environment in a computationally efficient manner. Particularly, as applied to the mapping and navigation application discussed above, the method 200 generates a graphical display of a 3D virtual environment including a representation of accumulated precipitation that reflects past and present weather conditions in a real-world geographic location around the vehicle and/or around the in-vehicle information system 104. The method 200 improves the functioning of the in-vehicle information system 104 by enabling the processor 108 to execute a set of specific rules to efficiently render accumulated precipitation or other similar weather effects in a 3D virtual environment. Additionally, the method 200 is efficient enough to be used on embedded devices and mobile devices having relatively limited processing capabilities.

As used herein, the term "precipitation" refers to rain, drizzle, freezing rain, snow, sleet, hail, and the like, as well as to any mixture of the aforementioned weather conditions. As used herein, the phrase "accumulated precipitation" or "precipitation coverage" refers to a buildup over time of snowflakes, snow grains, snow pellets, rain, frozen raindrops, ice pellets, or other forms of precipitation on the ground or the surfaces of buildings, landmarks, or other objects in an environment.

The method 200 begins with a step of receiving weather data corresponding to a geographic region, the weather data including a sequence of precipitation intensity values, each precipitation intensity value being associated with a respective timestamp of a chronological sequence of timestamps (block 210). Particularly, with respect to the embodiments described in detail herein, the processor 108 is configured to operate the network device 152 to receive and/or retrieve weather data from the one or more online weather information sources 190, via the data network 180, corresponding to the geographic region around the vehicle and/or around the in-vehicle information system 104. The weather data includes precipitation information which indicates, for example, whether it is precipitating and, if so, a precipitation type (e.g., rain, snow, sleet, etc.) and precipitation intensity. Particularly, the processor 108 is at least configured to receive and/or retrieve a sequence of discrete precipitation intensity values P associated with a corresponding chronological sequence of discrete timestamps T. As used herein, the phrase "precipitation intensity value" refers to any value that indicates the intensity, strength, or power of a precipitation weather condition (e.g., rain, snow, sleet, etc.). In one example, the precipitation intensity values may comprise a strings, such as "light," "medium," or "heavy," which can be converted to numeric values (e.g., "light"=1, "medium"=2, and "heavy"=3). In another example, the precipitation intensity values may comprise a number or percentage, which may or may not be bounded by some predetermined scale or range.

Figure 3:
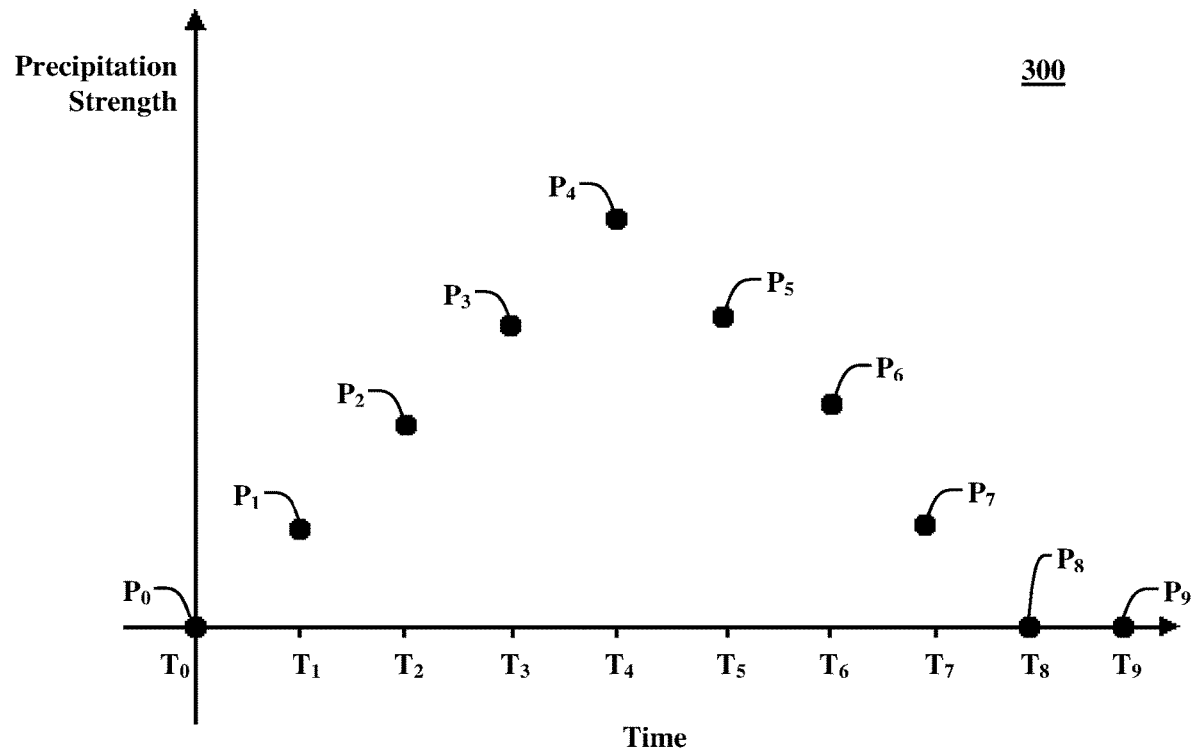
FIG. 3 shows a data plot which includes an exemplary sequence of precipitation intensity associated with respective timestamps.

FIG. 3 shows a data plot 300 which includes an exemplary sequence of precipitation intensity values $P_0$ through $P_9$ associated with respective timestamps $T_0$ through $T_9$. The horizontal axis of the data plot 300, labeled as "Time," indicates the value of the timestamps $T_0$ through $T_9$. The vertical axis of the data plot 300, labeled as "Precipitation Strength," indicates the magnitude of the precipitation intensity values $P_0$ through $P_9$. Exemplary values for the precipitation intensity values $P_0$ through $P_9$ may comprise $P_0=0$, $P_1=0.2$, $P_2=0.35$, $P_3=0.6$, $P_4=0.8$, $P_5=0.67$, $P_6=0.4$, $P_7=0.22$, $P_8=0$, and $P_9=0$. Exemplary values for the timestamps $T_0$ through $T_9$ may comprise $T_0=11:00$ AM, $T_1=12:00$ PM, $T_2=13:00$ PM, $T_3=14:00$ PM, $T_4=15:00$ PM, $T_5=16:00$ PM, $T_6=17:00$ PM, $T_7=18:00$ PM, $T_8=19:00$ PM, and $T_9=20:00$ PM.

In at least one embodiment, the precipitation intensity values $P_0$ through $P_9$ are actually weighted precipitation intensity values, which differ from the real precipitation intensity values received from the online weather information source 190. Particularly, the processor may have received real precipitation intensity values $P_0=0.6$, $P_1=0.8$, $P_2=0.7$, $P_3=0.8$, $P_4=0.8$, $P_5=0.9$, $P_6=0.8$, $P_7=0.9$, $P_8=0.7$, and $P_9=0.8$. Next, the processor 108 multiplied real precipitation intensity values by weight values $W_0=0$, $W_1=0.25$, $W_2=0.5$, $W_3=0.75$, $W_4=0.1$, $W_5=0.75$, $W_6=0.5$, $W_7=0.25$, $W_8=0$, and $W_9=0$, thereby arriving at the weighted precipitation intensity values $P_0=0$, $P_1=0.2$, $P_2=0.35$, $P_3=0.6$, $P_4=0.8$, $P_5=0.67$, $P_6=0.4$, $P_7=0.22$, $P_8=0$, and $P_9=0$. In at least one embodiment, the weight values depend upon the particular point in time of interest t, discussed in more detail below. Particularly, in the example, the particular point in time of interest t is 15:10 PM. The real precipitation intensity values which are closest to the particular point in time of interest t (e.g., $P_4$) are weighted most heavily and the real precipitation intensity values which are furthest from the particular point in time of interest t are weighted the least. In some embodiments, the weight values are also dependent upon the accumulation buffer length, discussed in more detail below, or dependent upon other factors such as a type of precipitation indicated by the weather data.

Returning to FIG. 2, the method 200 continues with a step of calculating a first precipitation accumulation value based on the sequence of precipitation intensity values, the first precipitation accumulation value corresponding to a first time (block 220). Particularly, the processor 108 is configured to calculate a precipitation accumulation value $P_{accumulation}$ for a particular point in time of interest t based on the sequence of precipitation intensity values P. The point in time of interest t may, for example, be a current time or some point in time in the past. As used herein, the phrase "precipitation accumulation value" refers to any value that indicates an amount or extent of accumulated precipitation. A precipitation accumulation value may have units such as inches or feet, but may also be a unit-less scalar.

FIG. 4 shows one exemplary method of implementing the step 220 in which the precipitation accumulation value $P_{accumulation}$ is calculated based on the sequence of precipitation intensity values. It is noted that the weather data provided by the online weather information source 190, including the sequence of precipitation intensity values, is generally discrete and cannot be directly used to render fully animated weather effects. Although for some types of animations, interpolation can be used to generate data for the animation, a simple interpolation can't be used to calculate an accumulation value for accumulated snow or wetness visual effects. This exemplary method of implementing the step 220 improves the functioning of the in-vehicle information system 104 by enabling the processor 108 to execute a set of specific rules to efficiently calculate an approximate accumulated precipitation at any given point in time t, thereby enabling an accurate depiction of accumulated precipitation in a 3D virtual environment to be rendered.

The exemplary method of implementing the step 220 begins with a step of defining an accumulation buffer length (block 222). Particularly, the processor 108 is configured to define an accumulation buffer length. In at least one embodiment, the accumulation buffer length is an integer quantity of samples L from the sequence of precipitation intensity values P that will be used to approximate an accumulated precipitation. In another embodiment, the accumulation buffer length is a window of time W extending backward from the particular point in time of interest t, which encompasses samples that will be used to approximate an accumulated precipitation.

In one embodiment, the processor 108 is configured to define the accumulation buffer length dependent on a type of precipitation indicated by the weather data. For example, if the weather data indicates that it is snowing, an accumulation buffer length might be defined as 4 samples or a window of 4 hours. Similarly, if the weather data indicates that it is raining, an accumulation buffer length might be defined as 2 samples or a window of 2 hours. In general, the accumulation buffer length, as well as the weight values $W_0$ through $W_9$ discussed above, are defined depending on an expected speed of evaporation and/or absorption of the accumulated precipitation, and may also be defined depending on other factors which influence the speed of evaporation and/or absorption (e.g., humidity, temperature, a type of terrain).

With continued reference to FIG. 4, the method of implementing the step 220 continues with a step of identifying a subset of precipitation intensity values from the sequence of precipitation intensity values, a number of precipitation intensity values in the subset of precipitation intensity values being equal to the accumulation buffer length, the precipitation intensity values in the subset of precipitation intensity values being those that are associated with the most recent respective timestamps as compared to the first time (block 224). Particularly, the processor 108 is configured to identify a subset of precipitation intensity values from the sequence of precipitation intensity values P based on the defined accumulation buffer length and based on the point in time of interest t. Particularly, in the case that the accumulation buffer length is defined as an integer quantity of samples L, the processor 108 is configured to identify as the subset the L most recent precipitation intensity values from the point in time of interest t. Similarly, in the case that the accumulation buffer length is defined as a window of time W, the processor 108 is configured to identify as the subset precipitation intensity values that fall within the window of time W extending backward from the particular point in time of interest t.

Figure 5:
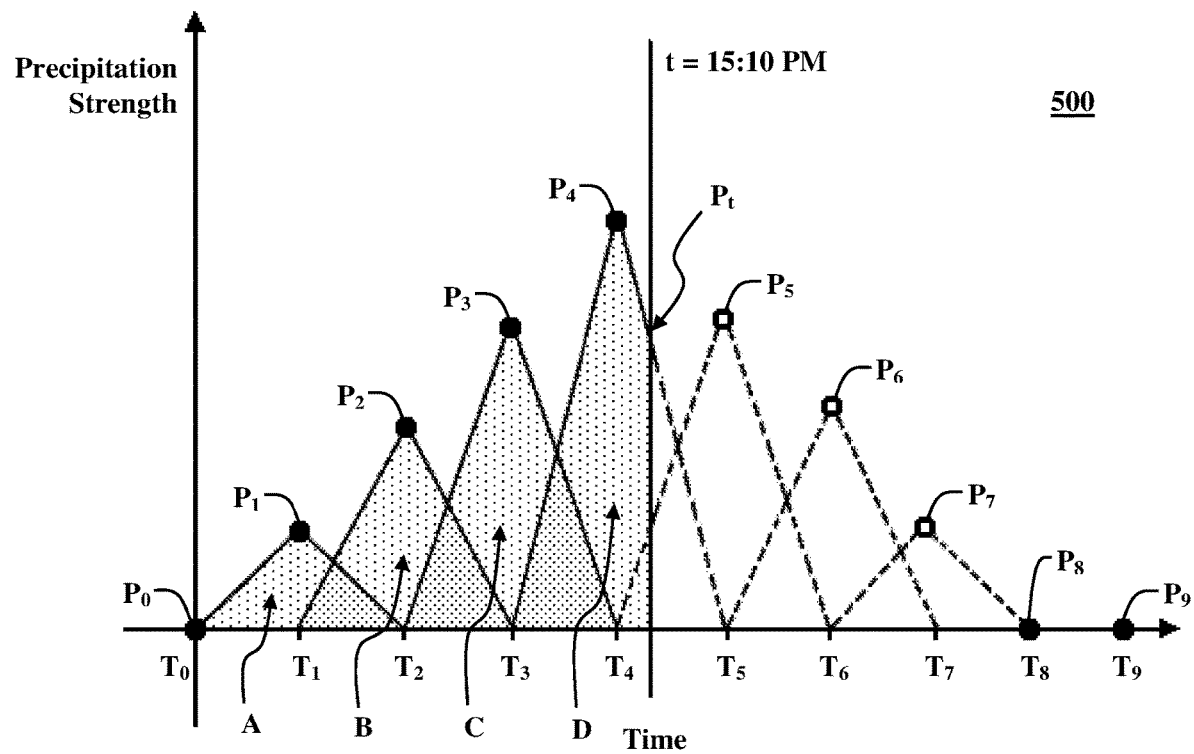
FIG. 5 shows an example determination of a precipitation accumulation value for accumulated snow at 15:10 PM.

FIG. 5 shows a data plot 500 illustrating an example determination of a precipitation accumulation value $P_{accumulation}$ for accumulated snow at 15:10 PM. In the example, the buffer accumulation buffer length has been defined as L=4 (e.g., four samples). Consequently, the precipitation intensity values $P_1$, $P_2$, $P_3$, and $P_4$, which are most recent with respect to the point in time t=15:10 PM, are identified as the subset of precipitation intensity values to be used for calculating the precipitation accumulation value $P_{accumulation}$.

Returning to FIG. 4, the method of implementing the step 220 continues with a step of calculating a respective buffer value for each precipitation intensity value in the subset of precipitation intensity values (block 226). Particularly, the processor 108 is configured to calculate a respective buffer value for each precipitation intensity value $P_i$ in the subset of the precipitation intensity values P.

In at least one embodiment, the processor 108 is configured to calculate at all but one of the buffer values as an area of a triangle as shown in FIG. 5. Particularly, in the example of FIG. 5, a buffer value $B_1$ for the precipitation intensity value $P_1$ is calculated as the area of a triangle A formed by the points $(T_1, P_1)$, $(T_0, 0)$, and $(T_2, 0)$. Similarly, a buffer value $B_2$ for the precipitation intensity value $P_2$ is calculated as the area of a triangle B formed by the points $(T_2, P_2)$, $(T_1, 0)$, and $(T_3, 0)$. Finally, a buffer value $B_3$ for the precipitation intensity value $P_3$ is calculated as the area of a triangle C formed by the points $(T_3, P_3)$, $(T_2, 0)$, and $(T_4, 0)$. Using the known formula for the area of a triangle, the calculation of each respective buffer value $B_i$ can be generalized in the form of the equation:

$$B_i = \frac{1}{2} \times P_i \times (T_{i+1} - T_{i-1}), \quad (1)$$

where i is the index for the respective precipitation intensity value for which the buffer value is being calculated, $P_i$ is the respective precipitation intensity value, $T_{i+1}$ is the timestamp associated with of the next precipitation intensity value $P_{i+1}$, and $T_{i-1}$ is the timestamp associated with of the previous precipitation intensity value $P_{i-1}$.

However, the processor 108 is configured to calculate the buffer value for the most recent precipitation intensity value using a modified formulation. Particularly, in the example of FIG. 5, a buffer value $B_4$ for the precipitation intensity value $P_4$ is calculated as the area of a quadrilateral D formed by the points $(T_4, P_4)$, $(T_3, 0)$, $(t, 0)$, and $(t, P_t)$. The area of a quadrilateral D can be calculated as a difference between the area of a triangle formed by the points $(T_4, P_4)$, $(T_3, 0)$, and $(T_5, 0)$ and the area of a triangle formed by the points $(t, P_t)$, $(t, 0)$, and $(T_5, 0)$. Using the known formula for the areas of triangles, the calculation of the most recent buffer value $B_i$ can be generalized in the form of the equation:

$$B_i = \frac{1}{2} \times P_i \times (T_{i+1} - T_{i-1}) - \frac{1}{2} \times P_t \times (T_{i+1} - t), \quad (2)$$

where i is the index for the respective precipitation intensity value for which the buffer value is being calculated, $P_i$ is the respective precipitation intensity value, $T_{i+1}$ is the timestamp associated with of the next precipitation intensity value $P_{i+1}$, $T_{i-1}$ is the timestamp associated with of the previous precipitation intensity value $P_{i-1}$, and t is the particular point in time of interest.

Since the value $P_t$ is unknown, the processor 108 is configured to calculate the value $P_t$ as a value on a line connecting the points $(T_4, P_4)$ and $(T_5, 0)$ at the time t. Particularly, the calculation of the value $P_t$ can be generalized in the form of the equation:

$$P_t = P_i \times \frac{T_{i+1} - t}{T_{i+1} - T_i}, \quad (3)$$

where i is the index for the respective precipitation intensity value for which the buffer value is being calculated, $P_i$ is the respective precipitation intensity value, $T_i$ is the timestamp associated with the respective precipitation intensity value, $T_{i+1}$ is the timestamp associated with of the next precipitation intensity value $P_{i+1}$, and t is the particular point in time of interest.

By combining the equations (2) and (3), the buffer value $B_4$ for the precipitation intensity value $P_4$ (i.e., the area of a quadrilateral D) can be calculated using the generalized equation:

$$B_i = \frac{1}{2} \times P_i \times (T_{i+1} - T_{i-1}) - \frac{1}{2} \times P_i \times \frac{T_{i+1} - t}{T_{i+1} - T_i} \times (T_{i+1} - t), \quad (4)$$

where i is the index for the respective precipitation intensity value for which the buffer value is being calculated, $P_i$ is the respective precipitation intensity value, $T_i$ is the timestamp associated with of the respective precipitation intensity value, $T_{i+1}$ is the timestamp associated with of the next precipitation intensity value $P_{i+1}$, $T_{i-1}$ is the timestamp associated with of the previous precipitation intensity value $P_{i-1}$, and t is the particular point in time of interest.

Additionally, in the case that the point in time of interest t is the current time, the actual value for the timestamp $T_{i+1}$ may be unknown. In one embodiment, the processor 108 is configured to receive and utilize forecasted values for $(T_{i+1}, P_{i+1})$ from the online weather information sources 190. However, if necessary, the processor 108 may be configured to extrapolate a value for the timestamp $T_{i+1}$ by assuming a consistent sampling period for the sequence of precipitation intensity values, such that the timestamp $T_{i+1}$ can be determined using the equation:

$$T_{i+1} = 2T_i - T_{i-1} \quad (5),$$

where i is the index for the respective precipitation intensity value for which the buffer value is being calculated, $T_i$ is the timestamp associated with of the respective precipitation intensity value, and $T_{i-1}$ is the timestamp associated with of the previous precipitation intensity value $P_{i-1}$.

Returning to FIG. 4, the method of implementing the step 220 continues with a step of calculating the first precipitation accumulation value as a sum of the respective buffer values for all of the precipitation intensity values in the subset of precipitation intensity values (block 228). Particularly, the processor 108 is configured to calculate the precipitation accumulation value $P_{accumulation}$ as a sum of the respective buffer values $B_i$ for all of the precipitation intensity values in the identified subset of the precipitation intensity values P. With respect to the example of FIG. 5, the precipitation accumulation value $P_{accumulation}$ is calculated as a sum of the buffer values $B_1$, $B_2$, $B_3$, and $B_4$, which correspond to the areas of A, B, C, and D.

Finally, returning to FIG. 2, the method 200 continues with a step of rendering a depiction of accumulated precipitation in the 3D virtual environment, the depiction of accumulated precipitation depending on the first precipitation accumulation value (block 230). Particularly, the processor 108, or more particularly the GPU 116, is configured to render a depiction of accumulated precipitation in a 3D virtual environment. The processor 108 is configured to render the depiction of accumulated precipitation differently depending on the precipitation accumulation value $P_{accumulation}$. For example, if the weather data indicates that it has been snowing for a quite some time and the precipitation accumulation value $P_{accumulation}$ is relatively high, the processor 108 may render the 3D virtual environment with significant snow accumulation depicted on the ground, and on other objects in the 3D virtual environment. Similarly, if the weather data indicates that it has been raining for a short time and the precipitation accumulation value $P_{accumulation}$ is relatively low, the processor 108 may render the 3D virtual environment with a small amount of wetness depicted on the ground, and on other objects in the 3D virtual environment. In at least one embodiment, the processor 108 is further configured to render additional features of the 3D virtual environment, such as roads, buildings, landmarks, etc.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for generating graphics of a three-dimensional (3D) virtual environment comprising:
    receiving, with a processor, weather data corresponding to a geographic region, the weather data including a sequence of precipitation intensity values, each precipitation intensity value being associated with a respective timestamp of a chronological sequence of timestamps;
    calculating, with the processor, a first precipitation accumulation value based on the sequence of precipitation intensity values, the first precipitation accumulation value corresponding to a first time; and
    rendering, with the processor, a depiction of accumulated precipitation in the 3D virtual environment, the depiction of accumulated precipitation depending on the first precipitation accumulation value.

2. The method according to claim 1, the calculating the first precipitation accumulation value further comprising:
    defining an accumulation buffer length;
    identifying a subset of precipitation intensity values from the sequence of precipitation intensity values, a number of precipitation intensity values in the subset of precipitation intensity values being equal to the accumulation buffer length, the precipitation intensity values in the subset of precipitation intensity values being those that are associated with the most recent respective timestamps of the chronological sequence of timestamps as compared to the first time; and
    calculating the first precipitation accumulation value based on the subset of precipitation intensity values.

3. The method according to claim 2, the calculating the first precipitation accumulation value further comprising:
    calculating a respective buffer value for each precipitation intensity value in the subset of precipitation intensity values; and
    calculating the first precipitation accumulation value as a sum of the respective buffer values for all of the precipitation intensity values in the subset of precipitation intensity values.

4. The method according to claim 3, the calculating the respective buffer value for each precipitation intensity value in the subset of precipitation intensity values further comprising:
    calculating at least some of the respective buffer values as an area of a respective triangle having a height equal to the respective precipitation intensity value and a base equal to a difference of the timestamp associated with of the next precipitation intensity value in the sequence of precipitation intensity values and the timestamp associated with of the previous precipitation intensity value in the sequence of precipitation intensity values.

5. The method according to claim 3, the calculating the respective buffer value for each precipitation intensity value in the subset of precipitation intensity values further comprising:
    calculating, for a most recent precipitation intensity value in the subset of precipitation intensity values that is associated with the most recent respective timestamp of the chronological sequence of timestamps relative to the first time, the respective buffer value as:

$$B_i = \frac{1}{2} \times P_i \times (T_{i+1} - T_{i-1}) - \frac{1}{2} \times P_i \times \frac{T_{i+1} - t}{T_{i+1} - T_i} \times (T_{i+1} - t),$$

where $B_i$ is the respective buffer value, $P_i$ is the respective precipitation intensity value, $T_i$ is the timestamp associated with of the respective precipitation intensity value, $T_{i+1}$ is the timestamp associated with of the next precipitation intensity value in the sequence of precipitation intensity values, and $T_{i-1}$ is the timestamp associated with of the previous precipitation intensity value in the sequence of precipitation intensity values; and
    calculating, for each precipitation intensity value in the subset of precipitation intensity values other than the most recent precipitation intensity value, the respective buffer value as:

$$B_i = \frac{1}{2} \times P_i \times (T_{i+1} - T_{i-1}),$$

where $B_i$ is the respective buffer value, $P_i$ is the respective precipitation intensity value, $T_{i+1}$ is the timestamp associated with of the next precipitation intensity value in the sequence of precipitation intensity values, and $T_{i-1}$ is the timestamp associated with of the previous precipitation intensity value in the sequence of precipitation intensity values.

6. The method according to claim 2, the defining the accumulation buffer length further comprising:
    defining the accumulation buffer length dependent on a type of precipitation indicated by the weather data.

7. The method according to claim 1 further comprising:
    weighting, before calculating the first precipitation accumulation value, each precipitation intensity value in the sequence of precipitation intensity values depending on at least one of (i) the first time and (ii) a type of precipitation indicated by the weather data.

8. A system for generating graphics of a three-dimensional (3D) virtual environment comprising:
    a display device configured to display the graphics of the 3D virtual environment;
    a networking device;
    a memory configured to store programmed instructions; and
    a processor operatively connected to the display device, the networking device, and the memory, the processor being configured to execute the programmed instructions to:
    receive, via the networking device, weather data corresponding to a geographic region, the weather data including a sequence of precipitation intensity values, each precipitation intensity value being associated with a respective timestamp of a chronological sequence of timestamps;

calculate a first precipitation accumulation value based on the sequence of precipitation intensity values, the first precipitation accumulation value corresponding to a first time; and render a depiction of accumulated precipitation in the 3D virtual environment, the depiction of accumulated precipitation depending on the first precipitation accumulation value.

9. The system of claim 8, the processor being further configured to execute the programmed instructions to:

define an accumulation buffer length;

identify a subset of precipitation intensity values from the sequence of precipitation intensity values, a number of precipitation intensity values in the subset of precipitation intensity values being equal to the accumulation buffer length, the precipitation intensity values in the subset of precipitation intensity values being those that are associated with the most recent respective timestamps of the chronological sequence of timestamps as compared to the first time; and calculate the first precipitation accumulation value based on the subset of precipitation intensity values.

10. The system of claim 9, the processor being further configured to execute the programmed instructions to:

calculate a respective buffer value for each precipitation intensity value in the subset of precipitation intensity values; and calculate the first precipitation accumulation value as a sum of the respective buffer values for all of the precipitation intensity values in the subset of precipitation intensity values.

11. The system of claim 10, the processor being further configured to execute the programmed instructions to:

calculate at least some of the respective buffer values as an area of a respective triangle having a height equal to the respective precipitation intensity value and a base equal to a difference of the timestamp associated with of the next precipitation intensity value in the sequence of precipitation intensity values and the timestamp associated with of the previous precipitation intensity value in the sequence of precipitation intensity values.

12. The system of claim 10, the processor being further configured to execute the programmed instructions to:

calculate, for a most recent precipitation intensity value in the subset of precipitation intensity values that is associated with the most recent respective timestamp of the chronological sequence of timestamps relative to the first time, the respective buffer value as:

$$B_i = \frac{1}{2} \times P_i \times (T_{i+1} - T_{i-1}) - \frac{1}{2} \times P_i \times \frac{T_{i+1} - t}{T_{i+1} - T_i} \times (T_{i+1} - t),$$

where $B_i$ is the respective buffer value, $P_i$ is the respective precipitation intensity value, $T_i$ is the timestamp associated with of the respective precipitation intensity value, $T_{i+1}$ is the timestamp associated with of the next precipitation intensity value in the sequence of precipitation intensity values, and $T_{i-1}$ is the timestamp associated with of the previous precipitation intensity value in the sequence of precipitation intensity values; and calculate, for each precipitation intensity value in the subset of precipitation intensity values other than the most recent precipitation intensity value, the respective buffer value as:

$$B_i = \frac{1}{2} \times P_i \times (T_{i+1} - T_{i-1}),$$

where $B_i$ is the respective buffer value, $P_i$ is the respective precipitation intensity value, $T_{i+1}$ is the timestamp associated with of the next precipitation intensity value in the sequence of precipitation intensity values, and $T_{i-1}$ is the timestamp associated with of the previous precipitation intensity value in the sequence of precipitation intensity values.

13. The system of claim 9, the processor being further configured to execute the programmed instructions to:

define the accumulation buffer length dependent on a type of precipitation indicated by the weather data.

14. The system of claim 8, the processor being further configured to execute the programmed instructions to:

weight, before calculating the first precipitation accumulation value, each precipitation intensity value in the sequence of precipitation intensity values depending on at least one of (i) the first time and (ii) a type of precipitation indicated by the weather data.

* * * * *